(12) United States Patent
Oakeson et al.

(10) Patent No.: US 6,530,523 B1
(45) Date of Patent: Mar. 11, 2003

(54) VISUALLY SIGNIFICANT MULTILEVEL BAR CODES

(75) Inventors: Kenneth L. Oakeson, Boise, ID (US); Izhak Baharav, San Jose, CA (US); Angela K. Hanson, Eagle, ID (US); Terry P. Mahoney, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 275 days.

(21) Appl. No.: 09/677,266

(22) Filed: Sep. 26, 2000

(51) Int. Cl.[7] .................................................. G06K 7/10
(52) U.S. Cl. .................. 235/462.01; 235/494
(58) Field of Search ..................... 235/462.01, 494, 235/462.1, 462.13, 462.15, 470, 383, 385; 382/181, 183, 194, 271; 156/277; 348/220.1; 283/67; 705/14

(56) References Cited

U.S. PATENT DOCUMENTS

| | | | |
|---|---|---|---|
| 5,153,418 A | 10/1992 | Batterman et al. | 235/494 |
| 5,189,292 A | 2/1993 | Batterman et al. | 235/494 |
| 5,223,701 A | 6/1993 | Batterman et al. | 235/494 |
| 5,602,377 A | * 2/1997 | Beller et al. | 235/462.5 |
| 5,635,012 A | * 6/1997 | Belluci et al. | 156/277 |
| 5,818,023 A | * 10/1998 | Meyerson et al. | 235/470 |
| 5,979,941 A | * 11/1999 | Mosher, Jr. et al. | 283/67 |
| 6,314,406 B1 | * 11/2001 | O'Hagan et al. | 705/14 |
| 2001/0043273 A1 | * 11/2001 | Herrod et al. | 348/220.1 |

FOREIGN PATENT DOCUMENTS

JP     2001-52142 A   * 2/2001

* cited by examiner

*Primary Examiner*—Michael G. Lee
*Assistant Examiner*—Jared J. Fureman (57) ABSTRACT

In a bar code encoding process, two or more images and two or more data items may be encoded together to form a bar code image. A bar code image encoding two or more images and two or more data items may also be decoded to regenerate the encoded images and data items. In addition, the bar code image is preferably a visually significant image that resembles one of the images encoded in the bar code.

24 Claims, 8 Drawing Sheets

VISUALLY SIGNIFICANT MULTILEVEL BAR CODES

FIELD OF THE INVENTION

The present invention relates generally to bar code printing, and more particularly to bar code scanners and printers that can combine multiple images and multiple data strings into a single bar code, and then detect and utilize the bar code.

BACKGROUND OF THE INVENTION

Bar code technology provides an accurate, easy, and inexpensive method of data storage and data entry for computerized information management systems. A properly designed bar code system can offer substantial improvements in productivity, traceability, and materials management, thereby yielding significant cost savings.

Typically, data is extracted from a 1D bar code symbol with an optical scanner that develops a logic signal corresponding to the difference in reflectivity of the printed bars and the underlying media (spaces). The serial data stored in the symbol is retrieved by scanning over the printed bars and spaces with a smooth, continuous motion. This motion can be provided by an operator moving a hand-held wand, by a rotating mirror moving a collimated beam of light, or by an operator or system moving the symbol past a fixed beam of light. The logic signal representing the bars and spaces supplied by the scanner is translated from a serial pulse stream into computer readable data by a decoder.

As the name implies, most bar codes comprise a series of black and light bars printed in accordance with a unique code that contains information across one dimension, so that data may be represented.

Multi-dimensional bar codes are also in use. For example, two-dimensional (2D) bar codes comprise stacked symbology or multi-row code. 2D bar code also refers to matrix code, which is formulated based on the position of black spots within a matrix. Each black element is the same dimension, and it is the position of that element that codes the data.

Ordinary 1D bar code is "vertically redundant," meaning that the same information is repeated vertically. The heights of the bars can be truncated without any loss of information. However, the vertical redundancy allows a symbol with printing defects, such as spots, or voids, to still be read and decoded. For such codes, the higher the bar height, the more probability that at least one path along the bar code will be readable.

In contrast, a 2D code stores information along the height as well as the length of the symbol. Most 2D codes use check words to insure accurate reading. 2D code systems are practical where moving beam laser scanners, charge coupled device (CCD) scanners, and other comparable devices are available. 2D codes can also be read with hand held moving beam scanners by sweeping the horizontal beam down the symbol. However, reading a 2D symbol by sweeping a contact wand across the symbol has the normal criticality aspects of speed of sweep, resolution of the scanner, and symbol/reader distance.

2D codes were initially developed for applications where only a small amount of space was available for an automatic 1D symbol. However, with increased density of information storage with 2D and higher bar codes, the number of applications for such bar codes is multiplying. As an example of the advantages available from using 2D bar encoding, it is possible in the direct mail field to use 2D codes to store the name, address, and demographic information on the direct mail business reply cards. This larger amount of data in the 2D coding avoids the requirement to reference a remote database, thereby saving significant operational time. More specifically, in such direct mail applications, typically there is less than a 2% return from the mailing. If the return card is only coded with a reference number or access code to a remote database, the few returned cards must be checked against a very large database of potentially millions of names. This checking operation can be quite expensive in computer time.

However, if all of the important information is printed in the 2D code at the time the mailing label is printed, then there is very little additional cost, and a potential for great savings when the cards are returned, since the time and expense necessary to access the remote database is avoided. Similar savings can occur in field service applications where servicing data may be stored in a 2D symbol on the equipment. The field engineer uses a portable reader to obtain the information, rather than dialing up the home offices remote computer.

SUMMARY OF THE INVENTION

Briefly, in a method for forming a bar code consistent with the present invention an intermediate image is encoded based on a portion of a first image and a portion of a first data item. A portion of the bar code is encoded based on a portion of the intermediate image, a portion of a second image and a portion of a second data item.

In a further aspect of the invention, a method for decoding a bar code to form first and second images and first and second data items consistent with the present invention groups a predetermined number of pixels from the bar code into a block. The block is compared to a first table, and a portion of the first image, a portion of an intermediate image and a portion of the first data item is identified based on the comparison to the first table. The intermediate image is compared to a second table, and a portion of the second image and a portion of the second data item are identified based on the comparison to the second table. The first and second images and the first and second data items are formed based on the identified portions of the first and second images and first and second data items.

DETAILED DESCRIPTION OF THE PREFERRED EMBODIMENT

Consistent with the present invention, two or more images and two or more data items may be encoded together to form a bar code image. A bar code image encoding two or more images and two or more data items may also be decoded to regenerate the encoded images and data items. In addition, the formed bar code image is preferably a visually significant image that resembles one of the images encoded in the bar code.

Figure 1:
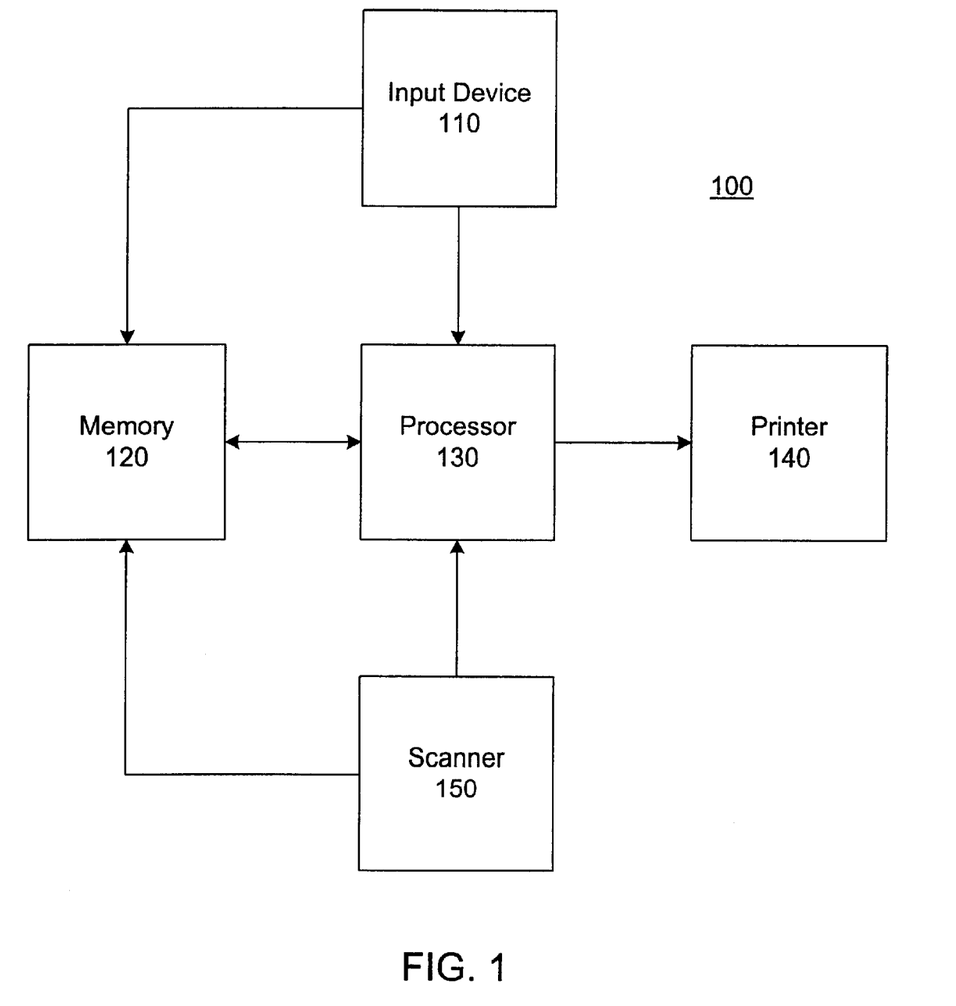
FIG. 1 is a block diagram of a bar code encoding and decoding system consistent with the present invention.

FIG. 1 is a block diagram of a bar code encoding and decoding system 100 consistent with the present invention. As shown in FIG. 1, the system 100 includes an input device 110, a memory 120, a processor 130, a printer 140 and a scanner 150. The input device 110 may be implemented as a keyboard, a mouse or other type of device for entering information into a computer. Information entered through the input device 110 may be stored in the memory 120 or provided to the processor 130.

The memory 120 may be implemented, for example, as a random access memory (RAM), a hard disk drive, some combination thereof, or any other convenient configuration including a networked configuration that is capable of storing information both permanently and temporarily. Note that the memory 120 may be implemented by storage across a network or the Internet. Information stored in the memory 120 may include bitmaps of images, relevant data, or other useful information.

The processor 130 receives information from the input device 110, the memory 120 and the scanner 150. The processor 130 may be configured to implement the bar code encoding and decoding process discussed below. Alternatively, the bar code encoding and decoding process consistent with the present invention may be implemented as a software application stored in the memory 120 or another convenient memory that is executed by the processor 130. When executing the bar code encoding process, the processor 130 may output the generated bar code to the printer 140 for printing on a document. When executing the bar code decoding process, the processor 130 may receive bar code information that is scanned from a document by the scanner 150. The scanner may also be used to scan in images or data for storage in the memory 120.

Figure 2:
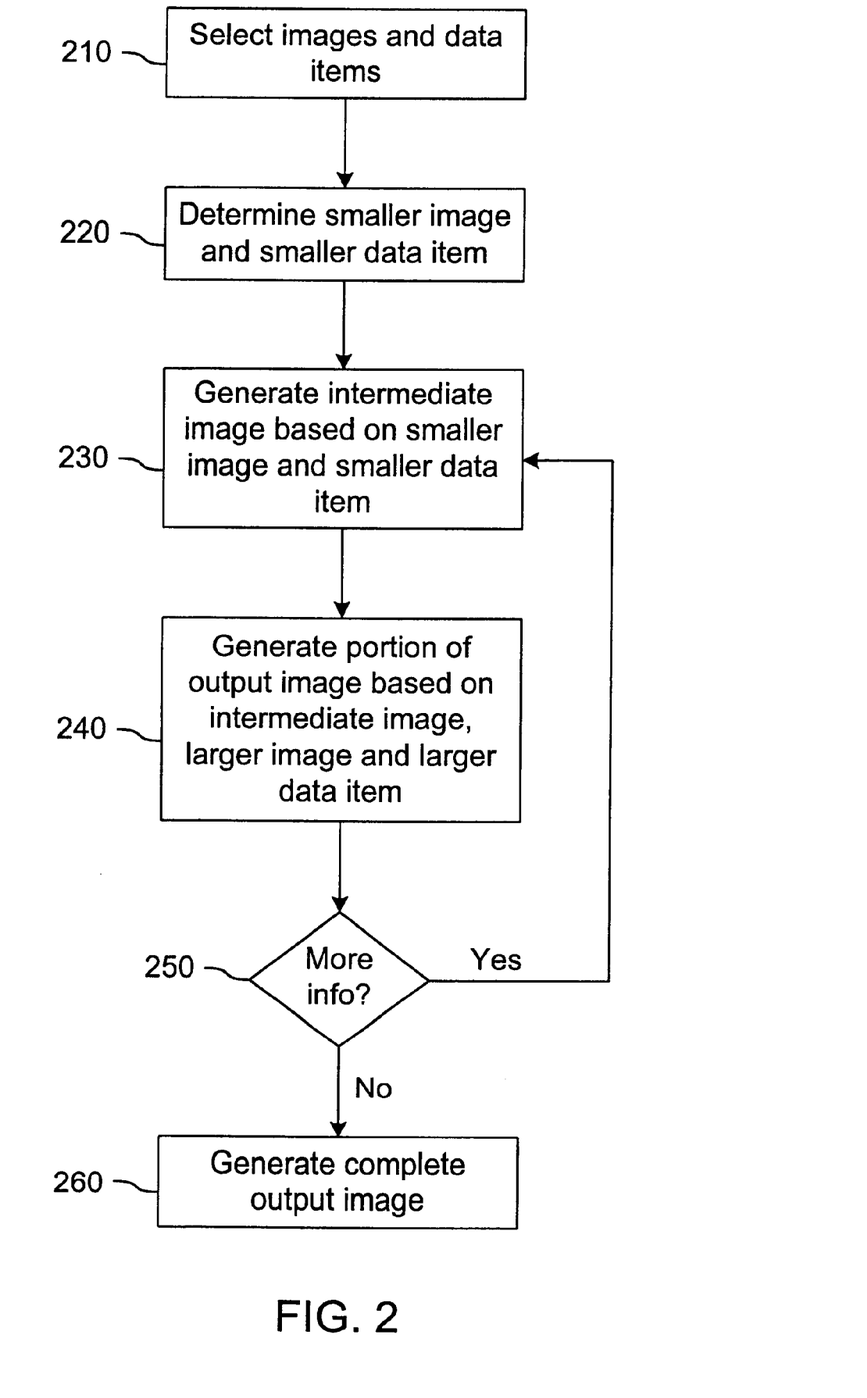
FIG. 2 is a flow diagram of an encoding process consistent with the present invention.

FIG. 2 is a flow diagram of a process for encoding images and data in a bar code consistent with the present invention. As shown in FIG. 2, the first step is to select images and data items to encode in a bar code (step 210). The images may be, for example, logos, figures, signatures, pictures or other images that are typically stored as pixel bitmaps in the memory 120. The data items may be, for example, text, numbers or combinations thereof, such as addresses, names, document tracking numbers, URLs, or company data, which are also typically stored in the memory 120. The images and data items that are selected may be classified as having a relatively low or high resolution, the resolution corresponding to the amount of information, such as pixels, per unit area. The images and data items may also be relatively larger or smaller, a larger image having more total pixels than a smaller image, and a larger data item having more total data than smaller data item.

Although the encoding and decoding process of the present invention may be applied to more than two images and more than two data items, the following description describes these processes for two images and two data items for reasons of simplicity. It will be clear to one of ordinary skill in the art in view of the following description how the encoding and decoding process may be extended to more than two images and two data items.

After selecting the images and data items, the system 100 determines, in this example, the smaller image of the selected images and the smaller data item of the selected data items (step 220). This determination may be done automatically by processor 130 or indicated by a user through input device 110. For example, the processor 130 may compare the number of pixels in the selected images and the amount of data in the data items to determine the smaller image and smaller data item.

The smaller image and the smaller data item are used to generate an intermediate image (step 230). In a preferred embodiment described in relation to FIG. 4, for each of one or more intermediate images, a different portion of the smaller image and the smaller data item are used to generate the intermediate image. The intermediate image may depend on the brightness or darkness of pixels in black and white images or on the particular color of pixels for color images. The intermediate image may also depend on one or more data bits in the data items.

To generate a portion of the output image, the intermediate image, the larger image and the larger data item are used (step 240). In a preferred embodiment described in relation to FIG. 6, a different portion of the intermediate image, larger image and larger data item are used to generate each different portion of the output image.

Once a portion of the output image data has been generated, it is determined whether there is additional information in the images and data items left to encode (step 250). This determination is preferably made by the processor 130. If there is additional information, then steps 230 and 240 are repeated. If not, then a complete output image is generated (step 260). The complete output image is generated from each of the portions of the output image generated at step 240. The complete output image may then be printed by printer 140.

Figure 3A:
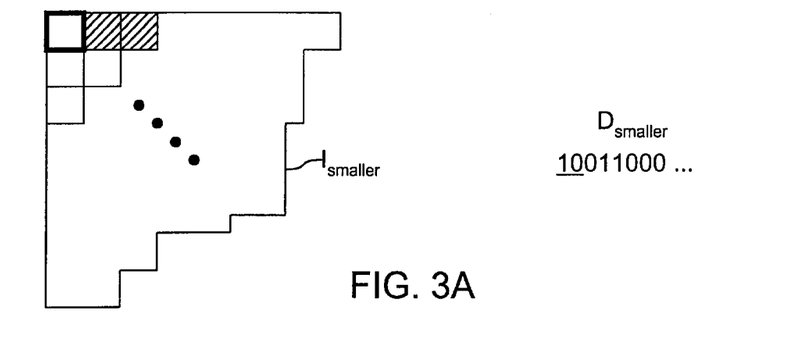
FIGS. 3A, 3B and 3C are examples of graphical representations of images and data for encoding consistent with the present invention.
Figure 3B:
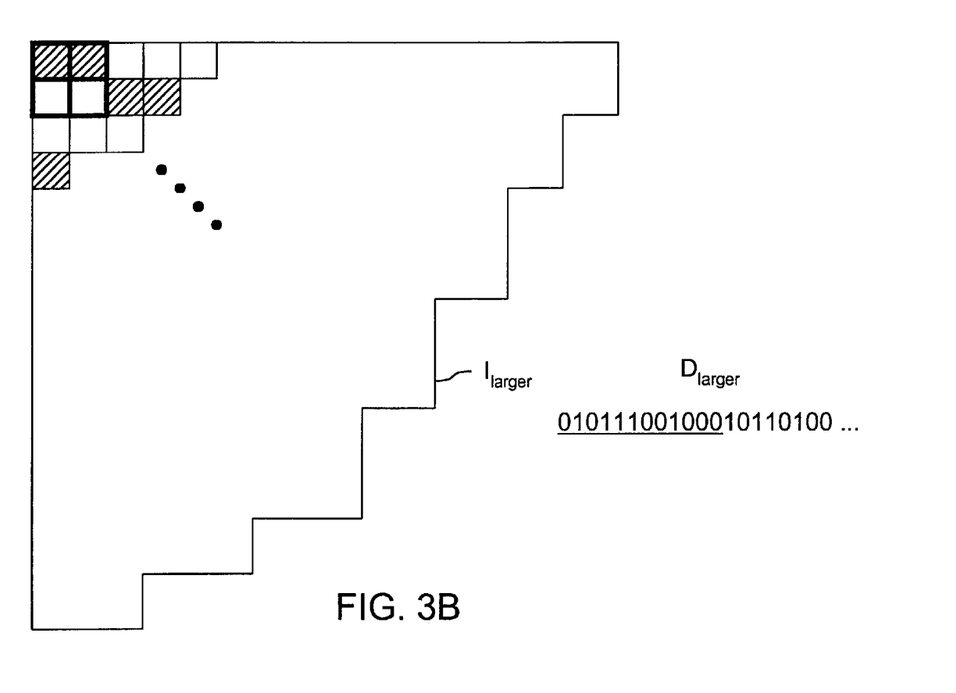
Figure 3C:
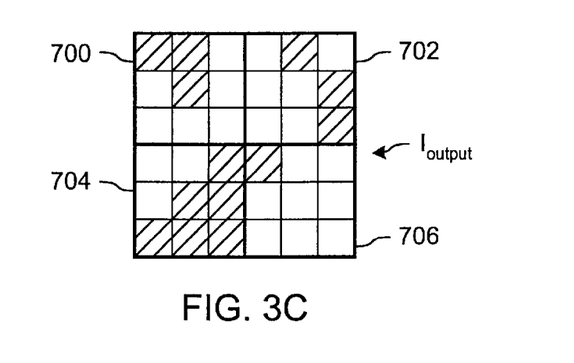

FIG. 3A shows an exemplary graphical representation of a portion of a smaller image $I_{smaller}$ and a portion of a smaller data item $D_{smaller}$. FIG. 3B shows an exemplary graphical representation of a portion of a larger image $I_{larger}$ and a portion of a larger data item $D_{larger}$. In FIG. 3A, the pixel in the upper left corner of $I_{smaller}$ is outlined in bold and the first two bits in $D_{smaller}$ are underlined to represent the portions thereof. In FIG. 3B, the four pixels in the upper left corner of $I_{larger}$ are outlined in bold and the first twelve bits in $D_{larger}$ are underlined to represent the portions thereof. As will be explained with respect to FIGS. 4–7, the bolded pixels and underlined bits are encoded to form a portion of the output image $I_{output}$, as shown in FIG. 3C.

Figure 4:
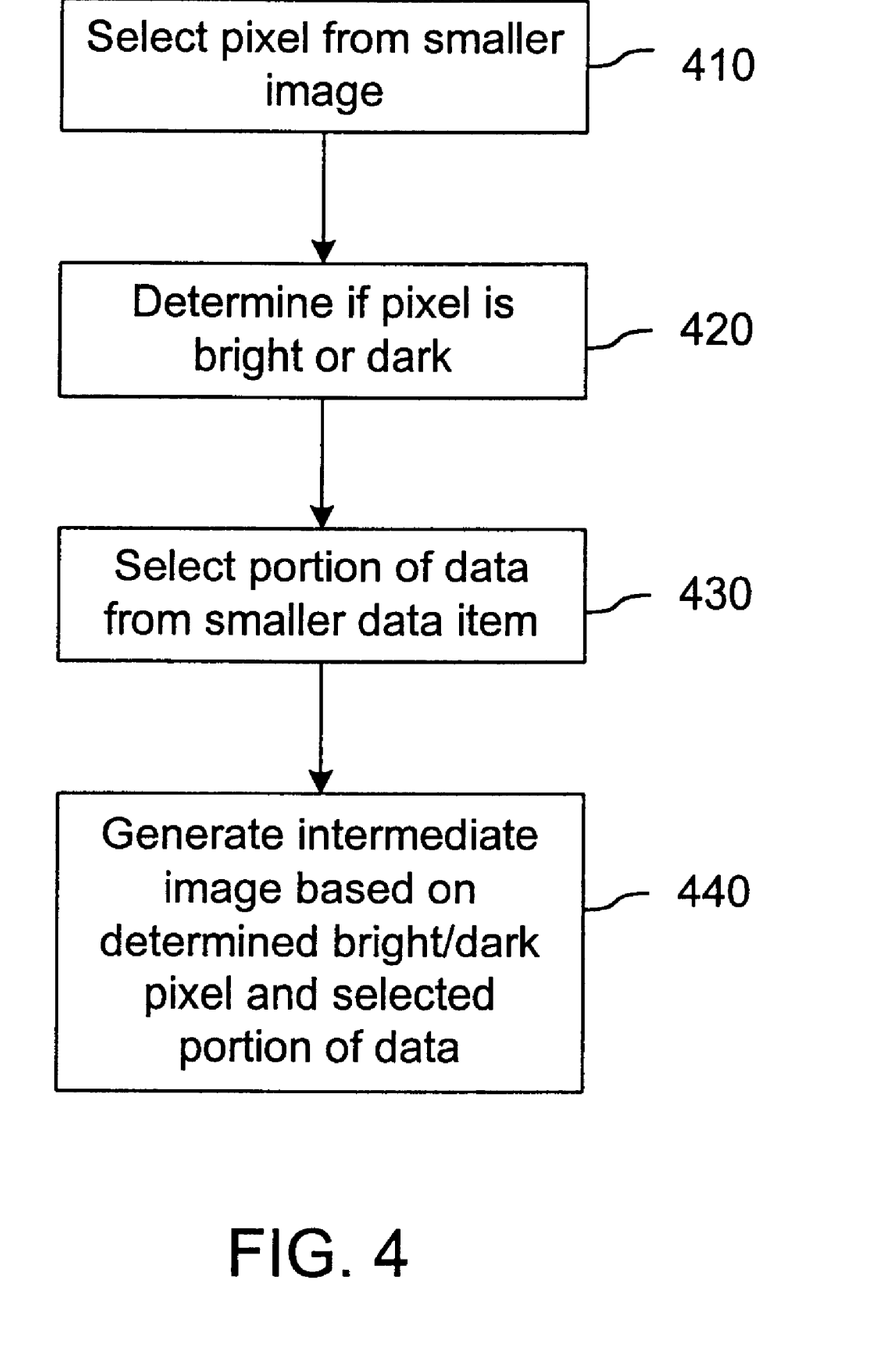
FIG. 4 is a flow diagram for generating the intermediate image of the encoding process of FIG. 2.

FIG. 4 is a flow diagram for generating the intermediate image described in the encoding process of FIG. 2 in a preferred embodiment of the present invention. As shown in FIG. 4, a pixel is selected from the smaller image (step 410). The order in which the pixels are selected from the smaller image is preferably done in a consistent order. A consistent selection order helps facilitate the decoding process. In particular, the order in which pixels are selected from the smaller image, as well as the intermediate image and larger image discussed below, determines how the images are reconstructed during the decoding process. For example, when one or more pixels of any of the images are reconstructed, the decoding process needs to know where to place them in the reconstructed images.

One example of a selection order for the smaller image is to select pixels from left to right, going from the top row to the bottom row. This selection order is by way of example only, as any convenient selection order can be used. With reference to the example in FIG. 3A, the selected pixel corresponds to the bolded pixel in the upper left corner of the smaller image $I_{smaller}$. Although in this embodiment only a single pixel is selected, other embodiments may select two or more pixels at a time.

It is then determined if the selected pixel is bright or dark (step 420). As can be seen in FIG. 3A, the pixel in the upper left corner is a bright pixel. If more than one pixel is selected, such as two pixels, the determination may be made that the pixels are both dark, both bright, or one bright and one dark.

In addition to selecting a pixel from the smaller image, a portion of the data from the smaller data item is selected (step 430). In FIG. 3A, the selected portion of the smaller data item $D_{smaller}$ corresponds to the first two underlined bits. Specifically, the selected bits are "10." Although two bits are selected, a single bit or more than two bits may be selected in other embodiments.

After selecting the pixel from the smaller image and the portion from the smaller data item, the intermediate image is generated (step 440). In a preferred embodiment, the intermediate image is generated by referencing a table using the selected pixel or pixels of the smaller image and the portion from the smaller data item.

Figure 5:
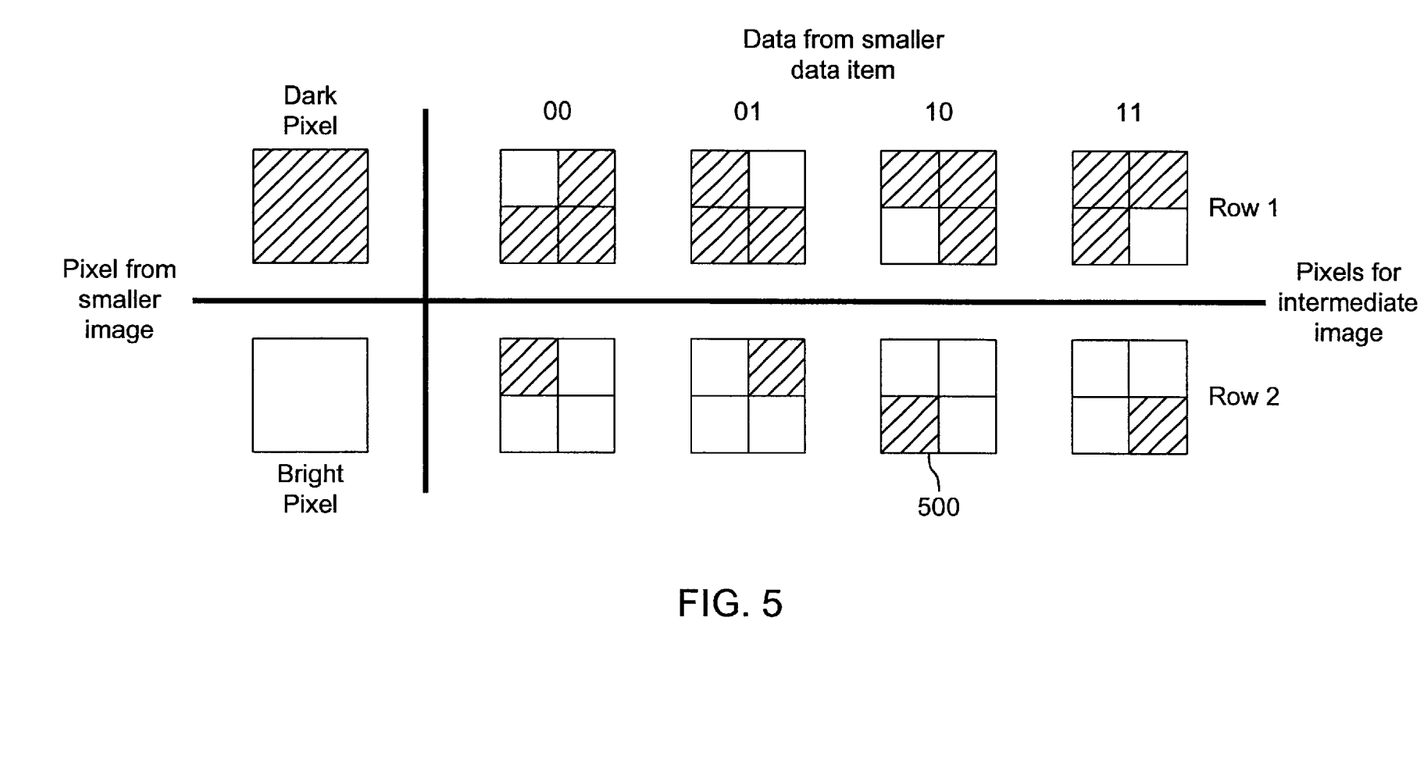
FIG. 5 is a graphical representation of a table used to generate the intermediate image of the encoding process of FIG. 2.

FIG. 5 is a graphical representation of a table for generating the intermediate image using a selected pixel of the smaller image and a portion from the smaller data item. As shown in FIG. 5, if the selected pixel is a dark pixel, the intermediate image is selected from the first row. If the selected pixel is a bright pixel, the intermediate image is selected from the second row.

The particular intermediate image chosen from the row determined by the brightness or darkness of the selected smaller image pixel depends on the value of selected bits from the smaller data item. With reference to FIG. 3A, since the selected pixel is a bright pixel and the selected bits are "10," the intermediate image 500 that is generated is in the second row under "10." As shown in FIG. 5, this intermediate image has one dark pixel in the lower left corner surrounded by three bright pixels.

The number of pixels in the intermediate image preferably corresponds to at least the number of possible combinations of the number of selected bits. For example, since two bits are selected in FIG. 3A, the intermediate image is generated as four pixels for each pixel of the smaller image because the two bits have four combinations, 00, 01, 10 and 11.

In addition, the intermediate image is preferably generated to reflect the brightness or darkness of the selected pixel as well as the value of the selected bits. In this example, where the selected pixel is bright, the intermediate image has three bright pixels and one dark pixel. Accordingly, the intermediate image is more bright than dark. Conversely, had the selected pixel been dark, the intermediate image would have three dark pixels and one bright pixel, and thus be more dark than bright. As will be explained with respect to FIG. 8, the position of the dark pixel within a majority bright intermediate image or the position of a bright pixel within a majority dark intermediate image may be used to determine the encoded bits of the smaller data item during the decoding process consistent with the present invention.

Figure 6:
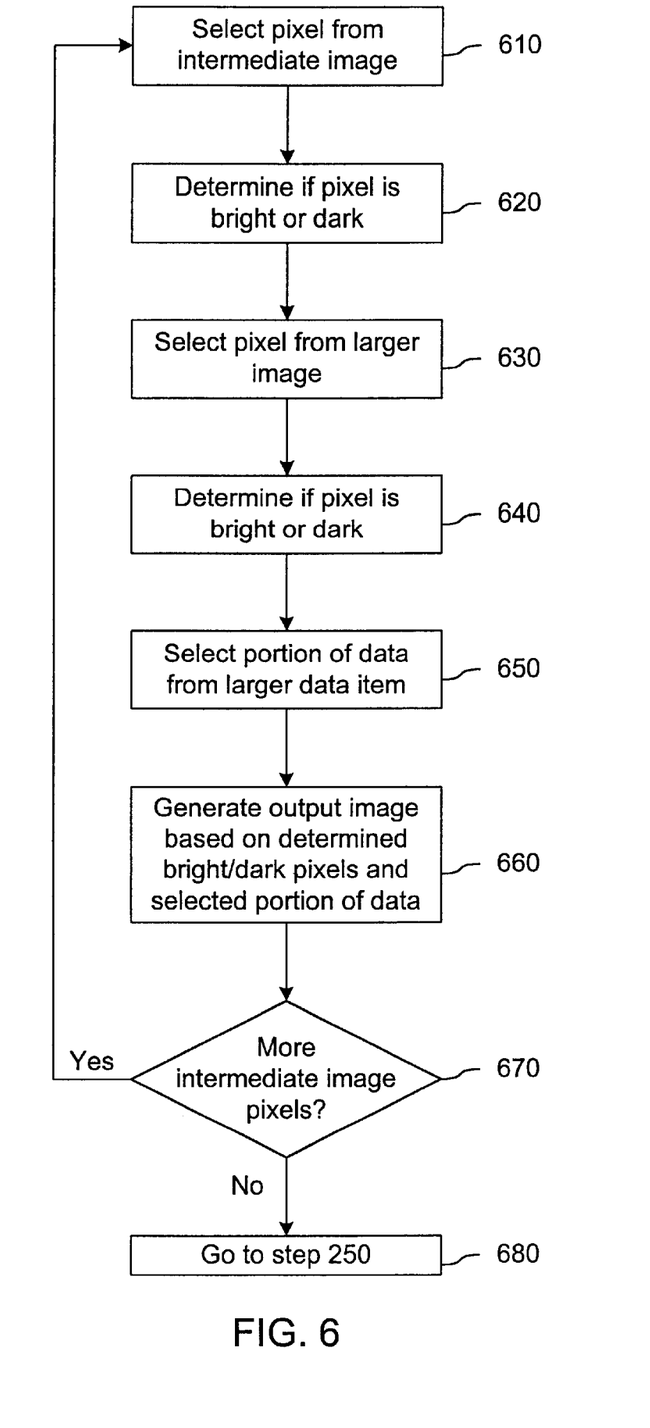
FIG. 6 is a flow diagram for generating the output image of the encoding process of FIG. 2.

Having generated the intermediate image, the next part of the process is to generate a portion of an output image therefrom. FIG. 6 is a flow diagram for generating the output image as described in the encoding process of FIG. 2 in a preferred embodiment of the present invention. As described below, the process shown in FIG. 6 is preferably repeated for portion of the intermediate image, such as each pixel. As a result, a different portion of the output image is generated for each portion or pixel of the intermediate image.

As shown in FIG. 6, the first step is to select a pixel from the intermediate image (step 610). As discussed above, the order in which the pixels are selected is preferably made in a consistent manner to help facilitate the decoding process. In the example shown in FIG. 5 where the intermediate image has four pixels, one example of a selection order for each intermediate image would be to choose the pixel in the upper left, followed by the upper right, the lower left and the lower right. This selection order is by way of example only, as any convenient selection order can be used. The pixel selected from the intermediate image is then determined to be bright or dark (step 620). From the example of FIG. 3A, with reference to FIG. 5, the pixel in the upper left corner is a bright pixel.

A pixel is also selected from the larger image (step 630). With reference to FIG. 3B, the pixel selected from the larger image $I_{larger}$ is preferably selected from a group equal in size to the number of pixels in the intermediate image, which is four in this example. Using the same selection order as the intermediate image, the pixel selected from the larger image $I_{larger}$ in FIG. 3B would be the upper left pixel of the group of four pixels outlined in bold. The selected pixel from the larger image is then determined to be bright or dark (step 640). From the example of FIG. 3B, the pixel in the upper left is a dark pixel.

After selecting a pixel from each of the intermediate image and the larger image, a portion of the data from the larger data item is selected (step 650). In this example with reference to FIG. 3B, three bits are selected from the larger data item $D_{larger}$, which corresponds to "010." Using the pixels from the intermediate image and the larger image and the portion of the larger data item, the output image is generated (step 660).

Figure 7:
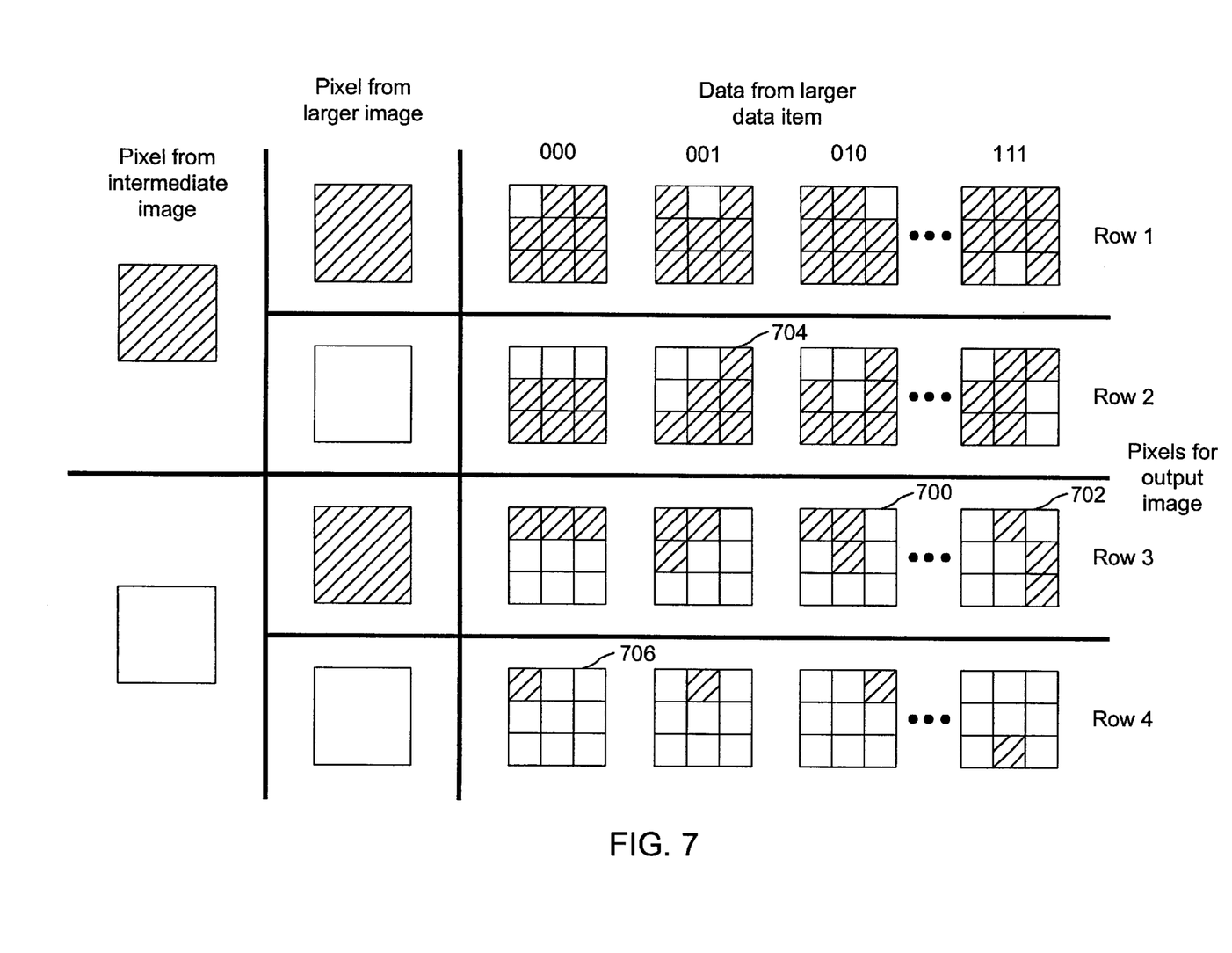
FIG. 7 is a graphical representation of a table used to generate the output image of the encoding process of FIG. 2.

The generation of the output image is preferably generated from a table similar to the table for generating the intermediate image. FIG. 7 is a graphical representation of a table for generating the output image using the pixels from the intermediate image and the larger image and the portion of the larger data item. As shown in FIG. 7, there are four rows of output images. A row is selected in accordance with the brightness or darkness of the selected pixel of the intermediate image and the selected pixel of the larger image. If the intermediate image pixel is dark, the first row is selected if the larger image pixel is dark, and the second row is selected if the larger image pixel is bright. If the intermediate image pixel is bright, the third row is selected if the larger image pixel is dark, and the fourth row is selected if the larger image pixel is bright.

The output image that is generated after selecting the row depends on the bits of the selected portion of the larger data item. Since in this example the number of selected bits is three, and there are eight combinations for the three bits, the output image is arranged as a 3×3 square consisting of nine pixels. If four bits were selected instead, the output image would preferably be arranged as a 4×4 square consisting of sixteen pixels, and so on.

In the example, it was determined that the pixel from the intermediate image was bright and the pixel from the larger image was dark. Accordingly, the third row of the table in FIG. 7 is selected. In addition, the three bits selected from the larger data item were "010." Accordingly, the output image 700 that is generated corresponds to the output image in the third row under the column for "010." The output image 700 is located in the upper left of the output image $I_{output}$, as shown in FIG. 3C.

After this portion of the output image is generated, it is determined if there are any remaining pixels in the intermediate image (step 670). If not, then the process is returned to step 250 of FIG. 2 (step 680). If there are remaining pixels, then steps 610 to 660 are repeated. In this example, there are still three remaining pixels in the intermediate image 500 of FIG. 5. Accordingly, steps 610 to 660 are repeated three more times.

In the next run through steps 610 to 660, with reference to intermediate image 500 and the bolded pixels of the larger image, a pixel from each of intermediate image 500 and the larger image is selected using the example selection order for pixels discussed previously, i.e., upper left, upper right, lower left, and lower right, for convenience of explanation. Using this selection order, it is determined that the intermediate image pixel is bright, the larger image pixel is dark and the selected bits are "111." Note that the selection order for the larger data item is, in this example, from left to right, in sequence. However, any convenient selection order may be used. Based on these values, the output image 702 that is generated from the table of FIG. 7 is in the third row under the column for "111." The output image 702 is shown in the upper right of the output image $I_{output}$ in FIG. 3C.

In the following run using the example selection sequence, it is determined that the intermediate image pixel is dark, the larger image pixel is bright and the selected bits are "001." Based on these values, the output image 704 that is generated is in the second row of the table in FIG. 7 under the column for "001." The output image 704 is shown in the lower left of the output image $I_{output}$ in FIG. 3C.

In the final run, it is determined that the intermediate image pixel is bright, the larger image pixel is bright and the selected bits. are "000." Based on these values, the output image 706 that is generated from the table of FIG. 7 is in the fourth row under the column for "000." The output image 706 is shown in the lower right of the output image $I_{output}$ in FIG. 3C.

As can be seen from FIGS. 2 and 6, the generation of the output image includes a partly iterative process. A first iterative process is shown in FIG. 2. As shown in FIG. 2, the process of generating intermediate images and portions of the output image is repeated until all of the information from the images and data items has been encoded. It should also be understood that multiple intermediate images are generated, each intermediate image corresponding to a portion of the smaller image and a portion of the smaller data item. A second iterative process is shown in FIG. 6. As shown in FIG. 6, the process of generating portions of the output image is repeated for each portion or pixel of the intermediate image generated by the process of FIG. 4.

When the encoding process is finished and the complete output image is generated, the complete output image may significantly resemble either the smaller image or the larger image. Whether the complete output image resembles the smaller image or the larger image may depend upon the arrangement of the output image pixels in the table of FIG. 7. In FIG. 7, as arranged, the brightness or darkness of the intermediate image pixels generally reflects the brightness or darkness of the selected pixel from the smaller image. As explained above with respect to FIG. 5, a bright pixel from the smaller image generates an intermediate image that has a majority of bright pixels, and a dark pixel from the smaller image generates an intermediate image that has a majority of dark pixels.

As also explained above with respect to FIG. 7, the darkness or brightness of the intermediate image and larger image pixels determines which row of the table of FIG. 7 is selected to generate the output image. For each row of this table, the number of dark pixels is the same. For example, in the first row, eight of the nine pixels are dark pixels, and in the second row, six of the nine pixels are dark pixels.

In FIG. 7, when both the intermediate image pixel and the larger image pixel are dark, eight of the nine output image pixels are dark. This result strongly reflects that the selected pixels of the larger image and the intermediate image, which correlates to the smaller image, are dark pixels. However, in row two of FIG. 7 for which the intermediate image pixel is dark and the larger image pixel is bright, six of the nine output image pixels are dark. The row two output image pixels more strongly reflect the dark intermediate image pixel than the bright larger image pixel because two thirds of the output image pixels are dark. Similarly, the row three output image pixels more strongly reflect the bright intermediate image pixel than the dark larger image pixel because two thirds of the output image pixels are bright.

As can be seen from the table of FIG. 7, the arrangement of bright and dark output image pixels in the table can be adjusted to reflect more strongly the brightness or darkness of the larger image pixel or, indirectly through the intermediate image pixels, the brightness or darkness of the smaller image pixel. For example, to make an even stronger correlation with the intermediate image pixels, the number of dark pixels in row two of FIG. 7 could be increased to seven and the number of dark pixels in row three of FIG. 7 could be reduced to two. Conversely, to make a stronger correlation to the larger image pixels, the number of dark pixels in row two of FIG. 7 could be reduced to two and the number of dark pixels in row three of FIG. 7 could be increased to seven.

Having the output image to resemble more strongly the smaller image or larger image may be implemented as a variably adjustable input to the encoding process. For example, a user may select two images and then provide an indication that the output image should more strongly resemble one of the two images. The amount to which the output image resembles either the smaller image or larger image generally depends on the combination of dark and bright pixels provided in the tables of FIGS. 5 and 7. The combination of dark and bright pixels in the tables can be used to calculate a percentage representing the amount the output image resembles the smaller image or the larger image.

Although the above description describes an encoding process for black and white images, i.e., having dark and bright pixels, the encoding process is equally applicable to color images having two or more colors. To implement the encoding process for color images, the number of rows in the tables of FIGS. 5 and 7 may be adjusted. For example, a color image having the colors red, green and blue would have three rows in FIG. 5 and nine rows in FIG. 7. The three rows in FIG. 5 would correspond to each of the three colors that may constitute the pixels of the smaller image. The nine rows in FIG. 7 would correspond to the nine possible combinations of color pixels for the intermediate and larger images.

In addition, instead of having combinations of dark and bright pixels for the intermediate and output image pixels, the combinations would be of red, green and blue pixels. For example, if the first row in FIG. 5 was for a red pixel of the smaller image, the pixels of the intermediate image may have three red pixels and one green pixel or three red pixels and one blue pixel. Similarly, if a row in FIG. 7 was for a red intermediate image pixel and a blue larger image pixel, the output image pixels may have a combination of red and blue pixels, with the number of red and blue pixels depending upon whether the complete output image is designed to more strongly resemble the smaller image or the larger image.

The encoding process may also be extended to encode three or more images and three or more data items. For example, to implement the encoding process for a third image and a third data item, a table in addition to the tables of FIGS. 5 and 7 may be used. Instead of corresponding to the output image, the pixels generated from the table of FIG. 7 would correspond to a second set of intermediate image pixels. The second set of intermediate image pixels would then be used in the process of FIG. 6 along with the third image and third data item with reference to a third table similar to the table of FIG. 7.

In the encoding process described above, it can be seen that multiple bits of data of the smaller data item are encoded for each pixel of the smaller image, multiple pixels of the larger image are encoded for each pixel of the smaller image, and multiple bits of data of the larger data item are encoded for each pixel of the larger image. As a result, the ratio of pixels to bits of data between the images and data items, as well as the ratio of pixels between the images, preferably correspond to the encoding ratio between them. For example, where two bits of data from the smaller data item are encoded for each pixel of the smaller image, it is preferable that there are twice as many bits in the smaller data item as there are pixels in the smaller image.

Where such ratios between images and data items are not exact, pixels or data bits may be reused for purposes of error correction or the tables of FIGS. 5 and 7 may be adjusted. For example, with respect to FIG. 5, if there are fewer than twice as many data bits in the smaller data item as pixels in the smaller image, the intermediate image pixels may be generated as all dark or all bright in accordance with the brightness or darkness of the extra smaller image pixels. With respect to FIG. 7, if there are not enough intermediate pixels for the amount of larger image pixels, then the first and fourth rows may be used for the extra larger image pixels. If there are intermediate pixels and larger image pixels but no data bits from the larger data item remaining, then another column may be added to the rows of the table for the additional pixels. Output images from this added column would be selected when there is no data remaining in the larger data item. The output images from this added column may include any unused combination of dark and bright pixels.

Figure 8:
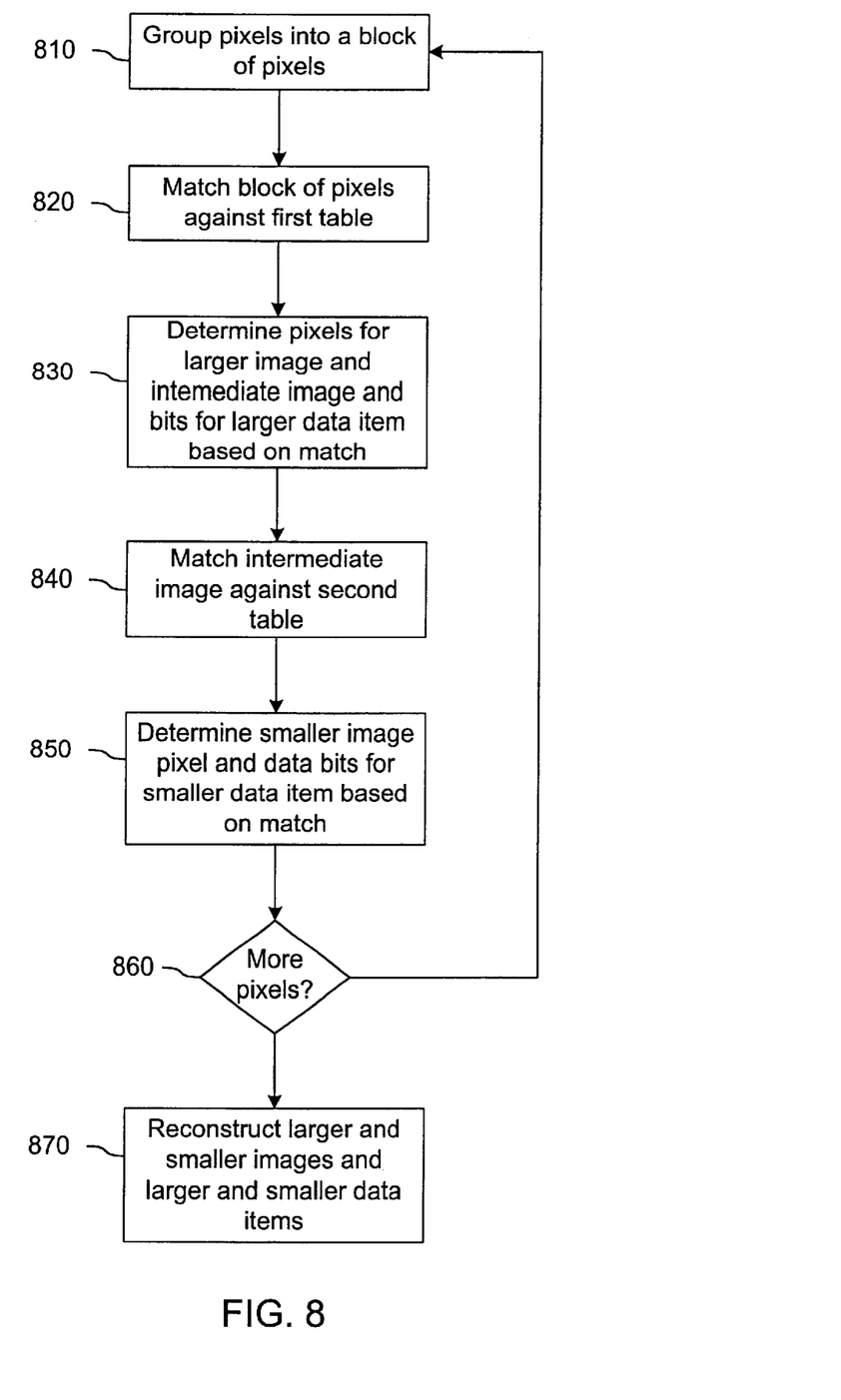
FIG. 8 is a flow diagram of a decoding process consistent with the present invention.

Up to this point, the description has been devoted mostly to the encoding process. However, the principles of the encoding process discussed above apply to the decoding process as well. FIG. 8 is a flow diagram of a decoding process consistent with the present invention. As discussed above, the processor 130 may be configured to implement the bar code decoding process discussed below. Alternatively, the bar code decoding process consistent with the present invention may be implemented as a software application stored in the memory 120 or another convenient memory that is executed by the processor 130. When executing the bar code decoding process, the processor 130 may receive bar code information that is scanned from a document by the scanner 150. The scanner 150 may also be used to scan in images or data for storage in the memory 120.

As shown in FIG. 8, the first step in the decoding process is to group pixels from a bar code image into a block of pixels (step 810). The pixels from the bar code image may be obtained by scanning the bar code image with the scanner 150. The resolution of the scanner is preferably high enough to pick up and identify each pixel of the bar code image. The number of pixels grouped into the block preferably correspond to the number of pixels generated for the output image as shown in FIG. 7. In FIG. 7, the number of pixels for each group would by a 3×3 square or nine total pixels, although this number may be higher or lower depending on the encoding process as described above.

After grouping the pixels from the bar code image into a block, the block is compared against a first table (step 820). For a bar code image encoded using the tables of FIG. 5 and FIG. 7, the block of pixels from the bar code image would be compared to the output image pixels in the table of FIG. 7. For example, with reference to FIG. 3C, the block of pixels 700 in the upper left would match output image pixels in the third row of FIG. 7 under "010." The matched block is used to determine the larger image pixel, the data bits from the larger data item and the intermediate image pixel (step 830) in accordance with the table of FIG. 7. The match for this example would determine that the data from the larger data item is "010," the pixel from the larger image is dark and the pixel from the intermediate image is bright.

The grouping, matching and determination are repeated to reassemble a complete intermediate image. In the encoding process described above, the complete intermediate image includes a 2×2 block of four pixels. Accordingly, in this example, the grouping, matching and determination is performed for four blocks of pixels from the bar code image, such as shown in FIG. 3C. Using the example of FIG. 3C, it would be determined that the complete intermediate image 500 has three bright pixels and one dark pixel, with the dark pixel in the lower left.

The reassembled intermediate image is then compared against a second table (step 840). For a bar code image encoded using the tables of FIG. 5 and FIG. 7, the reassembled intermediate image would be compared to the intermediate image pixels in the table of FIG. 5. In this example, the reassembled intermediate image 500 has three bright pixels and one dark pixel, with the dark pixel in the lower left. The reassembled intermediate image would match the intermediate image pixels in the second row under "10".

Based on the match, the values for the smaller image pixel and the data bits of the smaller data item are determined (step 850) in accordance with the table of FIG. 5. For the reassembled intermediate image of this example, the smaller image pixel would be a bright pixel and the data bits of the smaller data item would be "10." The bar code image is then checked to determine if there are any more pixels in the bar code image (step 860). If so, then steps 810 to 850 are repeated. If there are no more remaining pixels, then the smaller and larger images and the smaller and larger data items are reassembled from the decoded information (step 870).

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for forming a bar code, comprising:

encoding an intermediate image based on a portion of a first image and a portion of a first data item;

encoding a portion of the bar code based on a portion of the intermediate image, a portion of a second image and a portion of a second data item.

2. A method according to claim 1, wherein the portion of the bar code includes a majority of dark pixels if the portion of the intermediate image is a dark pixel and the portion of the second image is a bright pixel, and includes a majority of bright pixels if the portion of the intermediate image is a bright pixel and the portion of the second image is a dark pixel.

3. A method according to claim 1, wherein the portion of the bar code includes a majority of dark pixels if the portion of the intermediate image is a bright pixel and the portion of the second image is a dark pixel and includes a majority of bright pixels if the portion of the intermediate image is a dark pixel and the portion of the second image is a bright pixel.

4. A method according to claim 1, wherein the portion of the bar code includes a first number of dark pixels when the portion of the intermediate image and the portion of the second image are both bright pixels, a second number of dark pixels when the portion of the intermediate image and the portion of the second image are both dark pixels, a third number of dark pixels when the portion of the intermediate image is a bright pixel and the portion of the second image is a dark pixel, and a fourth number of dark pixels when the portion of the intermediate image is a dark pixel and the portion of the second image a bright pixel.

5. A method according to claim 4, wherein the bar code significantly resembles one of the first image and the second image.

6. A method according to claim 5, wherein the second number is greater than the fourth number, which is greater than the third number, which is greater than the first number when the bar code significantly resembles the first image.

7. A method according to claim 5, wherein the second number is greater than the third number, which is greater than the fourth number, which is greater than the first number when the bar code significantly resembles the first image.

8. A method for decoding a bar code to form first and second images and first and second data items, comprising:

grouping a predetermined number of pixels from the bar code into a block;

comparing the block to a first table;

identifying a portion of the first image, a portion of an intermediate image and a portion of the first data item based on the comparison to the first table;

comparing the intermediate image to a second table; and identifying a portion of the second image and a portion of the second data item based on the comparison to the second table;

forming the first and second images and the first and second data items based on the identified portions of the first and second images and first and second data items.

9. A system for forming a bar code, comprising:

a first encoder which encodes an intermediate image based on a portion of a first image and a portion of a first data item; and a second encoder which encodes a portion of the bar code based on a portion of the intermediate image, a portion of a second image and a portion of a second data item.

10. A system according to claim 9, wherein the portion of the bar code includes a majority of dark pixels if the portion of the intermediate image is a dark pixel and the portion of the second image is a bright pixel, and includes a majority of bright pixels if the portion of the intermediate image is a bright pixel and the portion of the second image is a dark pixel.

11. A system according to claim 9, wherein the portion of the bar code includes a majority of dark pixels if the portion of the intermediate image is a bright pixel and the portion of the second image is a dark pixel and includes a majority of bright pixels if the portion of the intermediate image is a dark pixel and the portion of the second image is a bright pixel.

12. A method according to claim 9, wherein the portion of the bar code includes a first number of dark pixels when the portion of the intermediate image and the portion of the second image are both bright pixels, a second number of dark pixels when the portion of the intermediate image and the portion of the second image are both dark pixels, a third number of dark pixels when the portion of the intermediate image is a bright pixel and the portion of the second image is a dark pixel, and a fourth number of dark pixels when the portion of the intermediate image is a dark pixel and the portion of the second image is a bright pixel.

13. A system according to claim 12, wherein the bar code significantly resembles one of the first image and the second image.

14. A system according to claim 13, wherein the second number is greater than the fourth number, which is greater than the third number, which is greater than the first number when the bar code significantly resembles the first image.

15. A system according to claim 13, wherein the second number is greater than the third number, which is greater than the fourth number, which is greater than the first number when the bar code significantly resembles the first image.

16. A system for decoding a bar code to form first and second images and first and second data items, comprising:

a grouping unit which groups a predetermined number of pixels from the bar code into a block;

a first comparator which compares the block to a first table and identifies a portion of the first image, a portion of an intermediate image and a portion of the first data item based on the comparison to the first table;

a second comparator which compares the intermediate image to a second table and identifies a portion of the second image and a portion of the second data item based on the comparison to the second table; and a reconstruction unit which forms the first and second images and the first and second data items based on the identified portions of the first and second images and first and second data items.

17. A computer program stored on a computer readable medium for forming a bar code comprising a plurality of instructions configured to:

encode an intermediate image based on a portion of a first image and a portion of a first data item;

encode a portion of the bar code based on a portion of the intermediate image, a portion of a second image and a portion of a second data item.

18. A computer program according to claim 17, wherein the portion of the bar code includes a majority of dark pixels if the portion of the intermediate image is a dark pixel and the portion of the second image is a bright pixel, and includes a majority of bright pixels if the portion of the intermediate image is a bright pixel and the portion of the second image is a dark pixel.

19. A computer program according to claim 17, wherein the portion of the bar code includes a majority of dark pixels if the portion of the intermediate image is a bright pixel and the portion of the second image is a dark pixel and includes a majority of bright pixels if the portion of the intermediate image is a dark pixel and the portion of the second image is a bright pixel.

20. A method according to claim 17, wherein the portion of the bar code includes a first number of dark pixels when the portion of the intermediate image and the portion of the second image are both bright pixels, a second number of dark pixels when the portion of the intermediate image and the portion of the second image are both dark pixels, a third number of dark pixels when the portion of the intermediate image is a bright pixel and the portion of the second image is a dark pixel, and a fourth number of dark pixels when the portion of the intermediate image is a dark pixel and the portion of the second image is a bright pixel.

21. A computer program according to claim 20, wherein the bar code significantly resembles one of the first image and the second image.

22. A computer program according to claim 21, wherein the second number is greater than the fourth number, which is greater than the third number, which is greater than the first number when the bar code significantly resembles the first image.

23. A computer program according to claim 21, wherein the second number is greater than the third number, which is greater than the fourth number, which is greater than the first number when the bar code significantly resembles the first image.

24. A computer program stored on a computer readable medium for decoding a bar code to form first and second images and first and second data items, comprising a plurality of instructions configured to:

group a predetermined number of pixels from the bar code into a block;

compare the block to a first table;

identify a portion of the first image, a portion of an intermediate image and a portion of the first data item based on the comparison to the first table;

compare the intermediate image to a second table; and identify a portion of the second image and a portion of the second data item based on the comparison to the second table;

form the first and second images and the first and second data items based on the identified portions of the first and second images and first and second data items.

* * * * *